US009439100B2

(12) United States Patent
Bajpai et al.

(10) Patent No.: US 9,439,100 B2
(45) Date of Patent: Sep. 6, 2016

(54) SYSTEM AND METHOD FOR DYNAMIC RATE ADAPTATION BASED ON REAL-TIME CALL QUALITY METRICS

(71) Applicant: Aruba Networks, Inc., Sunnyvale, CA (US)

(72) Inventors: Rajneesh Bajpai, San Jose, CA (US); Venkatesh Joshi, Karnataka (IN); Navin Kukreja, Karnataka (IN)

(73) Assignee: Aruba Networks, Inc., Sunnyvale, CA (US)

( * ) Notice: Subject to any disclaimer, the term of this patent is extended or adjusted under 35 U.S.C. 154(b) by 100 days.

(21) Appl. No.: 13/929,517

(22) Filed: Jun. 27, 2013

(65) Prior Publication Data

US 2014/0003236 A1    Jan. 2, 2014

Related U.S. Application Data

(60) Provisional application No. 61/665,158, filed on Jun. 27, 2012.

(51) Int. Cl.
*H04W 28/02* (2009.01)
*H04L 12/801* (2013.01)
*H04L 12/853* (2013.01)
*H04L 12/825* (2013.01)
*H04L 12/841* (2013.01)

(52) U.S. Cl.
CPC .......... *H04W 28/0236* (2013.01); *H04L 47/11* (2013.01); *H04L 47/2416* (2013.01); *H04L 47/25* (2013.01); *H04L 47/283* (2013.01); *H04W 28/02* (2013.01)

(58) Field of Classification Search
CPC ..... H04L 43/026; H04L 43/04; H04L 43/08; H04L 12/2686; H04L 12/4312; H04L 2463/121
USPC ....... 370/229, 231, 232, 233, 234, 252, 253, 370/310–350
See application file for complete search history.

(56) References Cited

U.S. PATENT DOCUMENTS

| | | | | |
|---|---|---|---|---|
| 7,164,649 | B2* | 1/2007 | Walton et al. | 370/203 |
| 7,808,908 | B1* | 10/2010 | Bharghavan et al. | 370/235 |
| 8,588,802 | B2* | 11/2013 | Usuda et al. | 455/452.2 |
| 2002/0136162 | A1* | 9/2002 | Yoshimura et al. | 370/229 |
| 2002/0181441 | A1* | 12/2002 | De Paul | H04Q 11/0478 370/352 |
| 2003/0096610 | A1* | 5/2003 | Courtney | H04B 7/2041 455/429 |
| 2003/0152034 | A1* | 8/2003 | Zhang et al. | 370/252 |
| 2003/0157900 | A1* | 8/2003 | Gaal et al. | 455/69 |
| 2004/0186877 | A1* | 9/2004 | Wang | H04L 29/06027 709/200 |
| 2004/0193762 | A1* | 9/2004 | Leon | H04L 29/06027 710/52 |
| 2004/0240390 | A1* | 12/2004 | Seckin | H04L 47/10 370/252 |
| 2004/0267956 | A1* | 12/2004 | Leon | H04L 12/5602 709/231 |
| 2007/0032200 | A1* | 2/2007 | Taneja | 455/70 |
| 2008/0181108 | A1* | 7/2008 | Hashmi | H04B 7/18513 370/231 |

(Continued)

*Primary Examiner* — Warner Wong
(74) *Attorney, Agent, or Firm* — Brooks, Cameron & Huebsch, PLLC

(57) ABSTRACT

According to one embodiment, a network device is configured to measure a quality of service associated with a real-time streaming packet received at a first transmission rate. The network device gathers metrics to a call quality based on the quality of service, wherein the metrics are specific to a wireless call quality, and adjusts the first transmission rate to a second transmission rate based on the metrics. Herein, the second transmission rate replaces the first transmission rate to balance between a transmission delay and reliability of the real-time streaming packet.

21 Claims, 5 Drawing Sheets

(56) References Cited

U.S. PATENT DOCUMENTS

2009/0147766 A1* 6/2009 Chamberlain et al. ....... 370/347
2010/0238805 A1* 9/2010 Ludwig et al. .............. 370/236
2012/0002717 A1* 1/2012 Ma .................... H04N 21/44209
                                                      375/240.01
2013/0170350 A1* 7/2013 Sarkar et al. ................. 370/235
2014/0313989 A1* 10/2014 Doken et al. ................. 370/329

* cited by examiner

SYSTEM AND METHOD FOR DYNAMIC RATE ADAPTATION BASED ON REAL-TIME CALL QUALITY METRICS

CROSS-REFERENCE TO RELATED APPLICATIONS

This application claims the benefit of U.S. Provisional Patent Application Ser. No. 61/665,158, filed on Jun. 27, 2012, the entire contents of which are incorporated by reference.

BACKGROUND

I. Problem

Conventional rate adaptation does not provide for dynamically adapting the transmission rates based on identification of real-time streaming and measuring of call quality metrics. Therefore, they are not able to dynamically improve call quality while taking preventive steps to avert dropped calls, specifically on a wireless network.

II. Prior Solutions

Previously, dynamic rate adaptation was not applied to real-time streaming. Quality of service guarantees in wireless networks are challenging because the air is a dynamic medium. When wireless networks have been used for data transmissions, such transmissions could tolerate delay, jitter, and packet loss without substantially impacting the end-user. Timing has become much more important when dealing with real-time streaming as opposed to data streams, because with real-time streaming, packets lost or out of order by 30-60 milliseconds are of no use to the end-user.

Real-Time Transport Control Protocol (RTCP) had previously been used to monitor a call's Quality of Service (QoS). However, RTCP only measures the end-to-end delay.

BRIEF DESCRIPTION OF THE DRAWINGS

Embodiments of the invention are illustrated by way of example and not by way of limitation in the figures of the accompanying drawings, in which like references indicate similar elements and in which.

DESCRIPTION OF INVENTION

The present invention consists of three main components: the identification of a traffic stream, the calculation of call quality metrics and the adjustment of the call quality metrics. This invention may be used to monitor and dynamically improve the QoS of real-time streaming transmission on a wireless network.

I. Computing Environment

Figure 1:
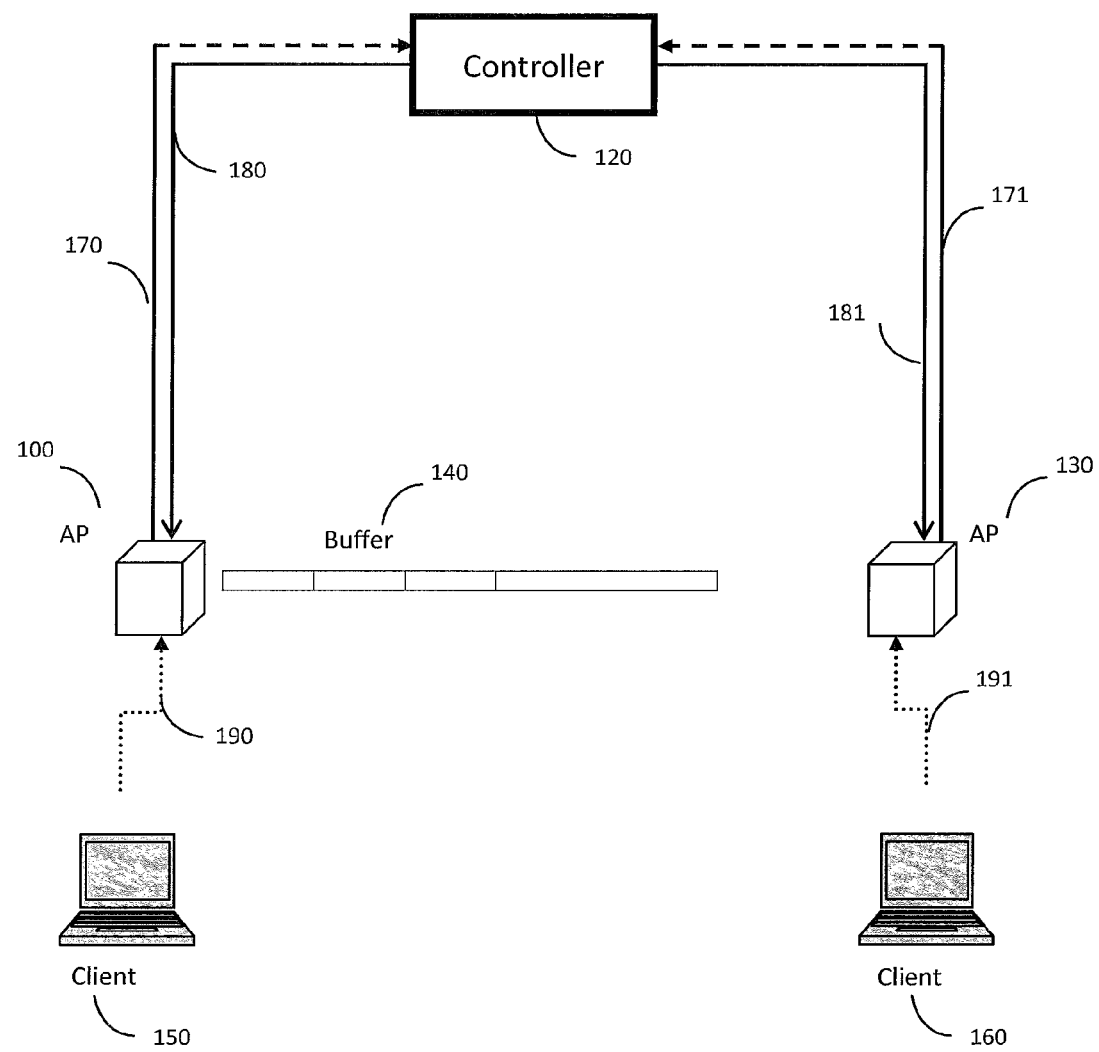
FIG. 1 is an exemplary block diagram of a communication scheme in accordance with dynamic rate adaptation.

Referring to FIG. 1, one embodiment in which the dynamic rate adaptation may be applied is comprised of Client [150], Client [160], AP [100], AP [130], and Controller [120]. In one embodiment Client [150] is connected to AP [100] through wireless connection [190]. In another embodiment, the client may be connected through a wired connection, and in yet another embodiment, the client may be connected to the AP through both a wired and wireless connection.

In FIG. 1, both AP [100] and AP [130] transmit data to Controller [120] via a wired connection. The transmission consists of upstream transmissions [170] and [171] and downstream transmissions [180] and [181]. Each AP will comprise a buffer. In the present example, AP [100] is shown to comprise Buffer [140].

II. Identification of Traffic Stream

In some embodiments, the type of traffic stream being transmitted needs to be identified prior to applying the dynamic rate adaptation. The identification occurs on a network device prior to the start of the traffic stream. A network device consists of, but is not limited to, an access point (AP), a controller, a hub, a bridge, and a router. The identification may take place on one or more network devices.

Identification of the stream is performed through information obtained from the TCP/IP session information, such as the 5-tuple consisting of {source IP address, destination IP address, protocol, source port number, destination port number}. This information is pulled from signaling messages transmitted by the client. Once the 5-tuple session information is obtained, the network device identifies a packet based on the 5-tuple session information using techniques such as control packet sniffing, deep packet inspection, etc.

A packet is not limited to data used in the Network Layer as described in the Open System Interconnection (OSI) Model but instead is meant to encompass transmissions of data of various sizes with various features. This may include, but is not limited to, a packet, a frame, a segment, a bit, and a datagram. The OSI Model is a way of characterizing a communication system into layers with each layer describing a function within the communication system. The OSI model specifically refers to data passing through its "Network Layer" as a packet.

This invention focuses on real-time streaming transmissions. Examples of real-time streaming transmissions include, but are not limited to, voice traffic streams (known as Voice over IP or VoIP) and video traffic streams. Once the traffic stream has been identified it is monitored on one or more network devices.

III. Calculation of Call Quality Metrics

In order to provide QoS for data transmissions over a wireless network comparable to that of a wired network, certain parameters making up the QoS may be adjusted dynamically. To accomplish such a dynamic rate adaptation, the call quality metrics for both the upstream and downstream traffic can be measured according to embodiments of the present disclosure.

As the metrics of each traffic stream are measured, they are simultaneously gathered and stored for computation of the total delay for each stream. The measuring of quality of service is one aspect in the dynamic rate adaptation where a delay is computed. Separate timestamps are assigned to two packets by the AP: one sampling packet being transmitted from the AP and an acknowledgement packet received by the AP. The upstream computation calls this sampling packet a special request packet and the downstream computation uses a downstream packet.

A. Upstream

Figure 2:
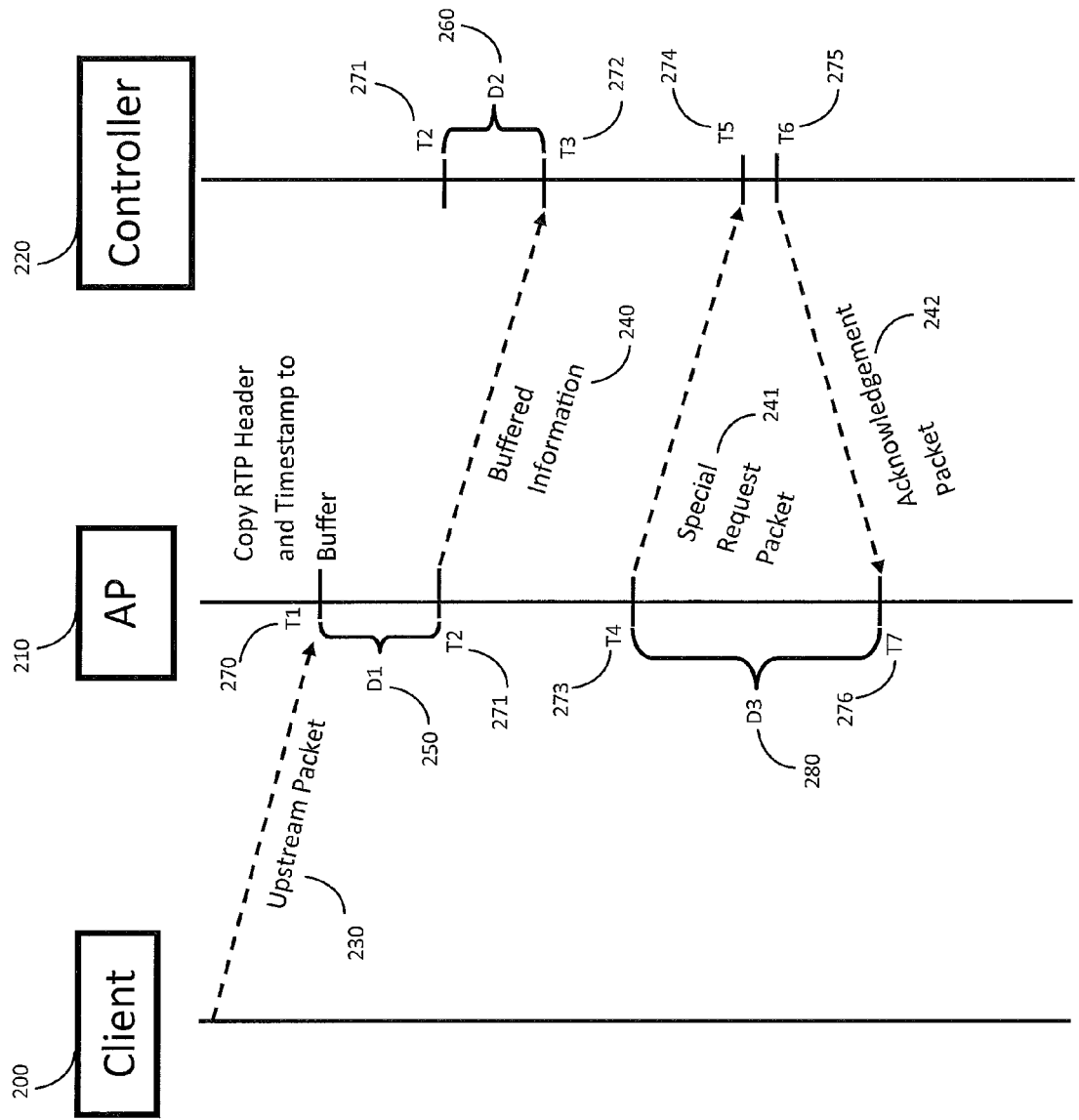
FIG. 2 is an exemplary timing sequence of the rate adaption process of FIG. 1.

Referring to FIG. 2, the upstream traffic is defined as any transmission received by the AP [210] from the client [200]. The Real-time Transport Protocol (RTP) header of the incoming transmission is copied into a buffer on the AP [210] and a timestamp is fastened to the header.

The AP [210] periodically sends the buffered information [240] to the controller [220]. The frequency of which the buffered information [240] is sent is fixed and is dependent on the traffic stream type. The buffered information [240] is transmitted to the controller [220] once the buffer is full. One factor which may influence transmission of the buffered information [240] is the periodicity of the traffic stream. Once the controller [220] receives the transmission of the buffered information [240] from the AP [210], the controller [220] determines the jitter and packet loss for the upstream transmission.

The AP [210] participates in the rate adaptation process by calculating the end-to-end delay for the upstream traffic. Two components are computed which comprise the end-to-end delay: the propagation delay [250] and the transmission delay [260]. The propagation delay [250] is the time taken by the AP [210] in processing the upstream packet [230] once it has been received by the client [200] and queuing it for transmission to the controller [220]. The propagation delay [250] is determined by taking the difference between the timestamps of the when the packet arrived at the AP and when the packet is queued for transmission to the controller [220].

The transmission delay [260] is the time taken for an upstream packet [230] to be sent from the AP [210] to the controller [220] and back to the AP [210]. This is computed by periodically sending a special request packet [241], waiting for an acknowledgement packet [242] from the controller [220], and taking the difference between the times the two events occurred.

The end-to-end delay is calculated for each upstream packet [230] that is received by the AP [210]. The upstream delay is computed from each metric that has been gathered by the AP [210]: upstream jitter, upstream packet loss, and end-to-end delay. The upstream delay is periodically sent to the controller.

B. Downstream

Figure 3:
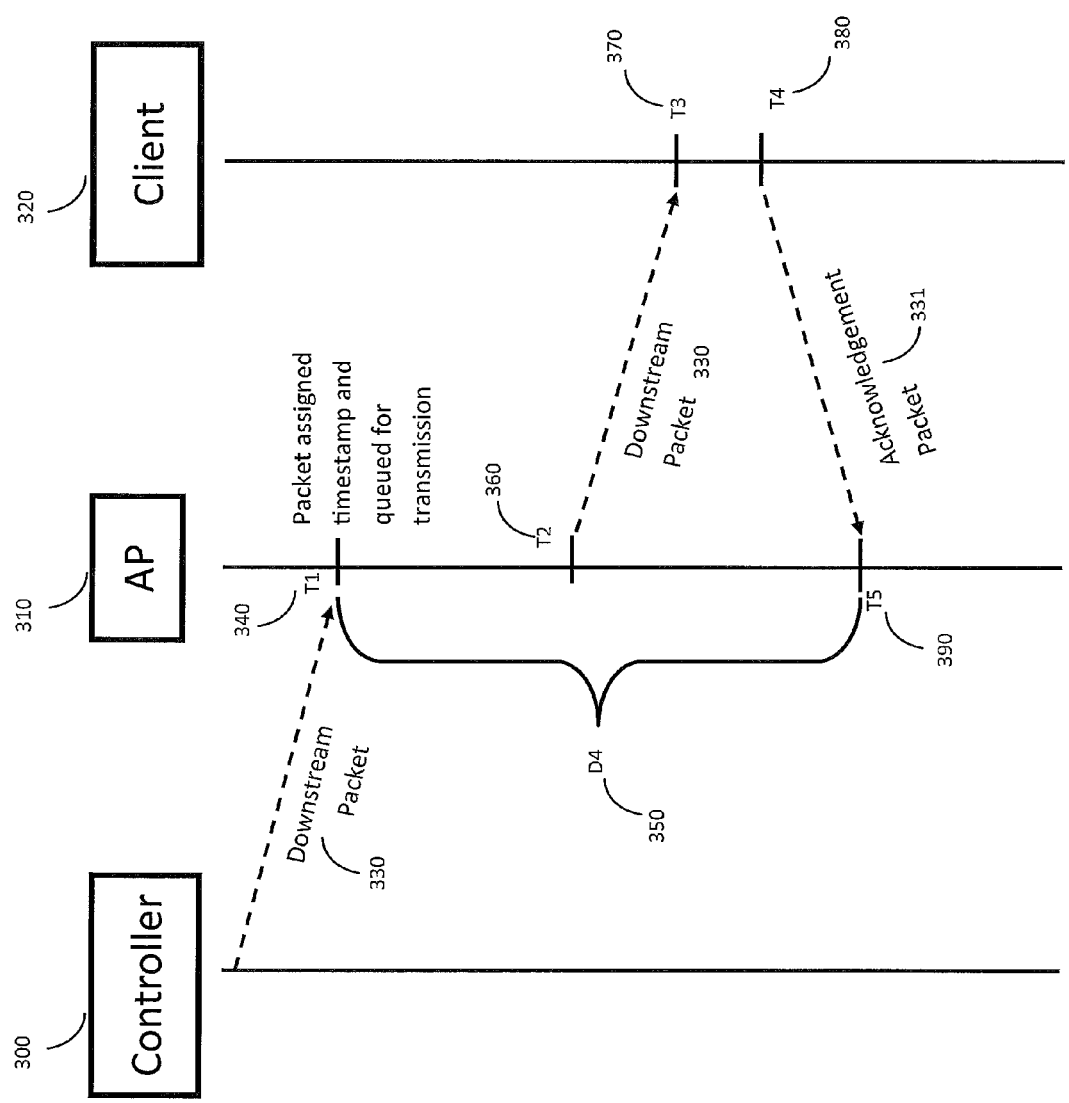
FIG. 3 is an exemplary timing sequence for measuring call quality metrics for the downstream real-time traffic.

Referring to FIG. 3, the call quality metrics are measured for the downstream real-time traffic on an AP for wireless transmissions. AP [310] determines how much time has elapsed between the arrival of downstream packet [330] at client [320] and the receipt of acknowledgement packet [331] from the client [320]. Downstream packet [330] is assigned a first timestamp at its arrival and downstream packet [330] is queued for transmission on AP [310]. AP [310] awaits an acknowledgement notifying AP [310] whether downstream packet [330] was successfully received or whether downstream packet [330] was lost. A second timestamp is assigned to acknowledgement packet [331] and end-to-end delay [350] is determined by computing the difference between the first timestamp and the second timestamp.

Furthermore, in the process to compute the end-to-end delay [350] of the transmission of a downstream packet [330] the AP [310] calculates packet loss as it is aware of which downstream packets are successfully received by the client [320] and which are lost through the acknowledgement packet [331]. The AP [310] also calculates the downstream packet jitter for the downstream transmission by analyzing the variance in the end-to-end delay [350] for each downstream packet [330].

The downstream call quality metrics are comprised of the three measurements computed on the AP [310] as described above: the end-to-end delay for a downstream packet [350], the downstream packet loss, and the downstream packet jitter. The downstream call quality metrics are periodically sent to the controller [300].

IV. Adjustment of Call Quality Metrics

As the controller is periodically sent the upstream and downstream call quality metrics, it is able to analyze the QoS being delivered to the client. Through analyses of the call quality metrics of transmissions in both the upstream and downstream directions, a dynamic rate adaptation algorithm adjusts one or more of several parameters in order to maintain a consistent, reliable service. Such parameters comprise: the rate of transmission of each packet, the number of retransmission attempts for each packet, and the transmit power of each packet.

As transmission proceeds, the QoS may change due to external factors such as interference in the medium or an increase in load on the system. In order to maintain a consistent and reliable QoS, the call quality metrics must be continuously measured. As the several factors are adjusted for subsequent packets, these packets are transmitted at a second transmission rate. The metrics are then measured and gathered on the second transmission rate. The dynamic rate adaptation algorithm is applied to this second transmission rate.

V. Dynamic Rate Adaptation Process

Figure 4A:
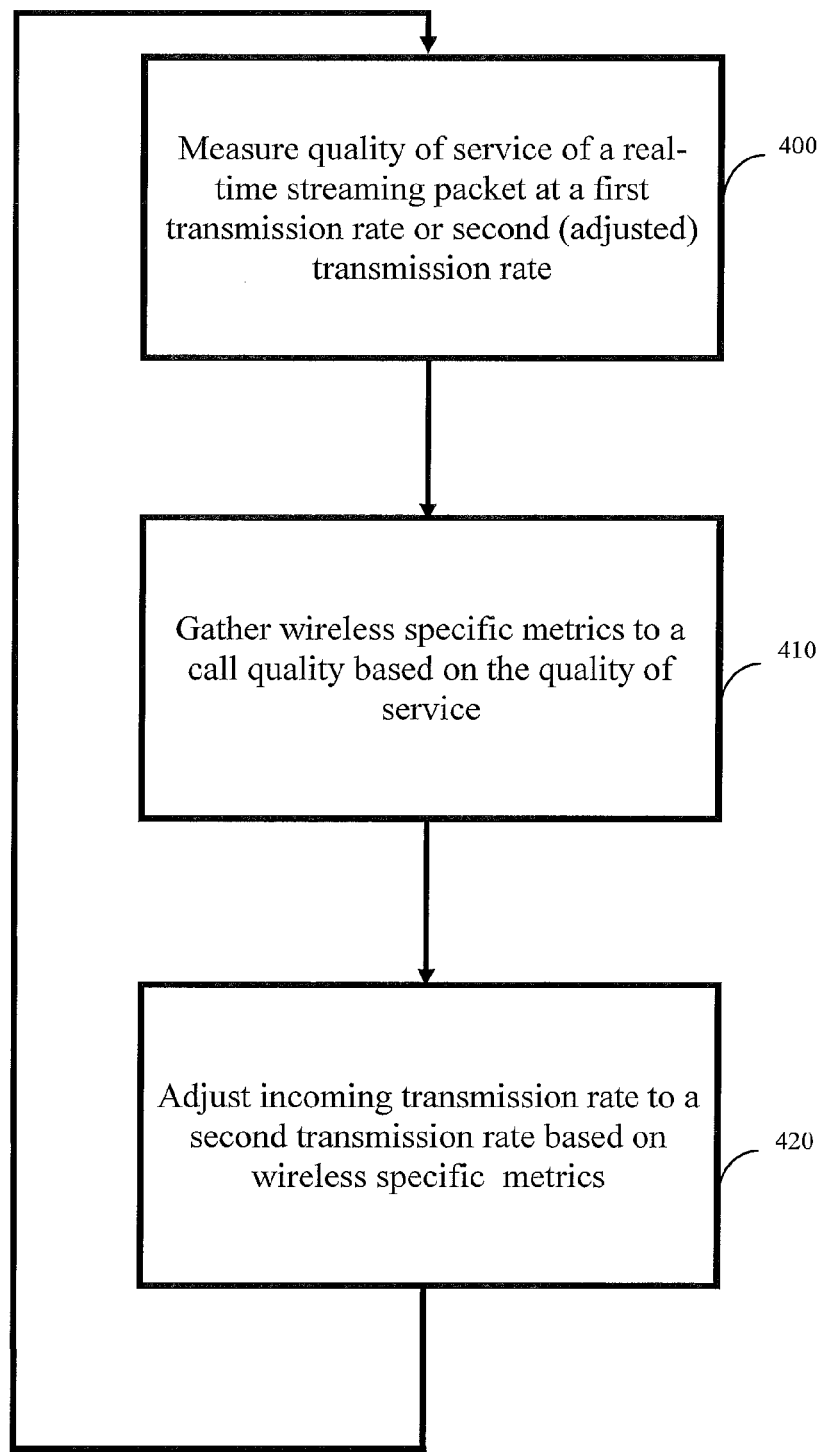
FIG. 4A is an exemplary flowchart of the rate adaptation process.

Referring to FIG. 4A, the rate adaptation process comprises three main components. The first step, block [400], comprises measuring the quality of service of a real-time streaming packet at a first transmission rate or at a second, adjusted transmission. A delay may be computed based on the transmission rate. Separate timestamps are assigned to two packets by the AP: one sampling packet being transmitted from the AP and an acknowledgement packet received by the AP.

The second step, block [410], comprises the gathering of wireless specific metrics to a call quality of the real-time streaming packet. Such metrics that are gathered a delay, a packet loss, and a packet jitter.

The third step, block 420, applies a dynamic rate adaptation algorithm to the first transmission rate to a second transmission rate based on the measuring of the quality of service and metrics gathered in blocks [400] and [410] respectively. The result of the adjustment of the first transmission rate based on the dynamic rate adaptation algorithm is a second transmission rate. The rate adaptation process then begins again on the second transmission rate in order maintain a constant, reliable service.

Figure 4B:
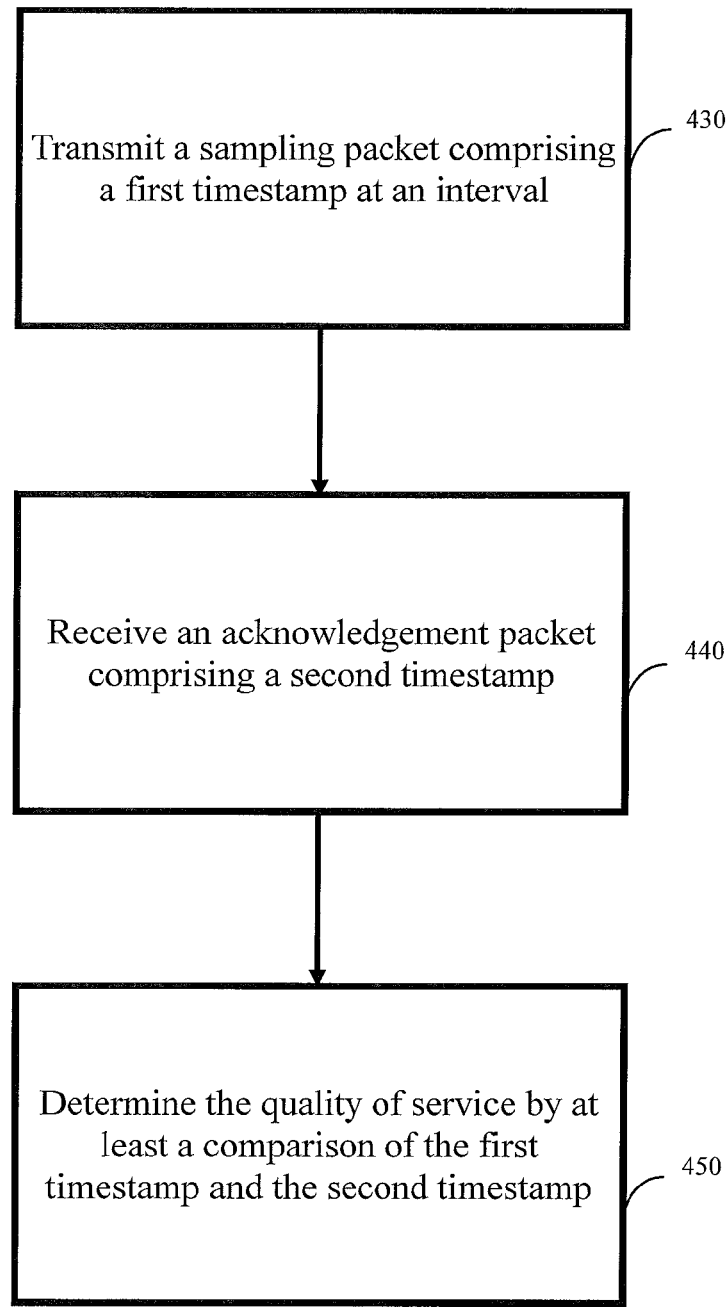
FIG. 4B is an exemplary flowchart of components for measuring the rate adaptation process.

Referring to FIG. 4B, the measuring of the rate adaptation process comprises three main components. The first component, block [430], comprises the transmission of a sampling packet comprising a first timestamp at an interval. The second component, block [440], receives an acknowledgement packet comprising a second timestamp. The third component, block [450], determines the quality of service by at least performing a comparison of the first timestamp and the second timestamp. In one embodiment, this determination may be based on at least the end-to-end delay.

Such a process can be implemented on a per packet basis, increasing the rate as which call quality may be improved.

What is claimed is:
1. A method comprising:
   transmitting, by a network device, a sampling packet for an upstream traffic and a downstream traffic including a transmit timestamp at an interval, wherein the interval is adjusted based on one or more of a per packet basis and a per client basis;

receiving an acknowledgement packet comprising a receipt timestamp;

determining a call quality of service, by the network device, for the upstream traffic and the downstream traffic based on a comparison of the transmit timestamp and the receipt timestamp for each of the upstream traffic and the downstream traffic, wherein the call quality of service is associated with a real-time streaming packet received at an upstream traffic transmission rate and a downstream traffic transmission rate; and adjusting the upstream traffic transmission rate and the downstream traffic transmission rate to a second upstream traffic transmission rate and a second downstream traffic transmission rate, respectively, based on the call quality of service for each of the upstream traffic and the downstream traffic, and based on call quality metrics including a reliability of a transmission of the real-time streaming packet and a transmission delay.

2. The method of claim 1, wherein the transmission delay includes a propagation delay or a transmission delay of the real-time streaming packet.

3. The method of claim 1, wherein the call quality metrics include packet loss, a jitter, a packet type, or a time gap between the sampling packet and the acknowledgement packet.

4. The method of claim 1, further comprising:
determining a new quality of service associated with the real-time streaming packet at the second transmission rate.

5. The method of claim 1, comprising:
sniffing a control packet or performing a deep packet inspection to identify the real-time streaming packet.

6. The method of claim 5, wherein the real-time streaming packet includes a packet type, and wherein the packet type is an i-frame, a p-frame, or a b-frame.

7. The method of claim 1, wherein adjusting the transmission rate includes increasing or decreasing the transmission rate of the real-time streaming packet, increasing or decreasing a number of retransmission attempts for the real-time streaming packet, or increasing or decreasing a transmission power associated with the real-time streaming packet.

8. A computing device, comprising:
one or more processors; and
a memory having instructions stored thereon, which when executed by the one or more processors, cause the computing device to perform operations including:
transmitting, by a network device, a sampling packet for an upstream traffic and a downstream traffic including a transmit timestamp at an interval, wherein the interval is adjusted based on one or more of a per packet basis and a per client basis;
receiving an acknowledgement packet comprising a receipt timestamp;
determining a call quality of service, by the network device, for the upstream traffic and the downstream traffic based on a comparison of the transmit timestamp and the receipt timestamp for each of the upstream traffic and the downstream traffic, wherein the call quality of service is associated with a real-time streaming packet received at an upstream traffic transmission rate and a downstream traffic transmission rate; and
adjusting the upstream traffic transmission rate and the downstream traffic transmission rate to a second upstream traffic transmission rate and a second downstream traffic transmission rate, respectively, based on the call quality of service for each of the upstream traffic and the downstream traffic, and based on call quality metrics including a reliability of a transmission of the real-time streaming packet and a transmission delay.

9. The computing device of claim 8, wherein the transmission delay includes a propagation delay or a transmission delay of the real-time streaming packet.

10. The computing device of claim 8, wherein the call quality metrics include packet loss, a jitter, a packet type, or a time gap between the sampling packet and the acknowledgement packet.

11. The computing device of claim 8, further comprising instructions, which when executed by the one or more processors, cause the computing device to perform operations including:
determining a new quality of service associated with the real-time streaming packet at the second transmission rate.

12. The computing device of claim 8, further comprising instructions, which when executed by the one or more processors, cause the computing device to perform operations including:
sniffing a control packet or performing a deep packet inspection.

13. The computing device of claim 5, wherein the real-time streaming packet includes a packet type, and wherein the packet type is an i-frame, a p-frame, or a b-frame.

14. The computing device of claim 8, wherein adjusting the transmission rate includes increasing or decreasing the transmission rate of the real-time streaming packet, increasing or decreasing a number of retransmission attempts for the real-time streaming packet, or increasing or decreasing a transmission power associated with the real-time streaming packet.

15. A computer-program product tangibly embodied in a non-transitory machine-readable storage medium, including instructions configured to cause a data processing apparatus to:
transmit, by a network device, a sampling packet for an upstream traffic and a downstream traffic including a transmit timestamp at an interval, wherein the interval is adjusted based on one or more of a per packet basis and a per client basis;
receive an acknowledgement packet comprising a receipt timestamp;
determine a call quality of service, by the network device, for the upstream traffic and the downstream traffic based on a comparison of the transmit timestamp and the receipt timestamp for each of the upstream traffic and the downstream traffic, wherein the call quality of service is associated with a real-time streaming packet received at an upstream traffic transmission rate and a downstream traffic transmission rate; and
adjust the upstream traffic transmission rate and the downstream traffic transmission rate to a second upstream traffic transmission rate and a second downstream traffic transmission rate, respectively, based on the call quality of service for each of the upstream traffic and the downstream traffic, and based on call quality metrics including a reliability of a transmission of the real-time streaming packet and a transmission delay.

16. The computer-program product of claim 15, wherein the transmission delay includes a propagation delay or a transmission delay of the real-time streaming packet.

17. The computer-program product of claim 15, wherein the call quality metrics include packet loss, a jitter, a packet type, or a time gap between the sampling packet and the acknowledgement packet.

18. The computer-program product of claim 15, further comprising instructions configured to cause the data processing apparatus to:
   determining a new quality of service associated with the real-time streaming packet at the second transmission rate.

19. The computer-program product of claim 15, further comprising instructions to cause the data processing apparatus to:
   sniff a control packet or perform a deep packet inspection to identify the real-time streaming packet.

20. The computer-program product of claim 19, wherein the real-time streaming packet includes a packet type, and wherein the packet type is an i-frame, a p-frame, or a b-frame.

21. The computer-program product of claim 15, wherein adjusting the transmission rate includes increasing or decreasing the transmission rate of the real-time streaming packet, increasing or decreasing a number of retransmission attempts for the real-time streaming packet, or increasing or decreasing a transmission power associated with the real-time streaming packet.

\* \* \* \* \*